(12) United States Patent
Bebout, IV

(10) Patent No.: US 9,329,068 B2
(45) Date of Patent: May 3, 2016

(54) APPARATUS AND METHOD FOR MEASURING CHOPPED WOOD WITH SERIES OF MEASUREMENT INDICATORS

(76) Inventor: Clifford K. Bebout, IV, Oceanport, NJ (US)

(*) Notice: Subject to any disclaimer, the term of this patent is extended or adjusted under 35 U.S.C. 154(b) by 300 days.

(21) Appl. No.: 13/525,429

(22) Filed: Jun. 18, 2012

(65) Prior Publication Data
US 2012/0321424 A1    Dec. 20, 2012

Related U.S. Application Data

(60) Provisional application No. 61/498,532, filed on Jun. 18, 2011, provisional application No. 61/541,226, filed on Sep. 30, 2011.

(51) Int. Cl.
| | |
|---|---|
| *B65D 90/48* | (2006.01) |
| *G01F 19/00* | (2006.01) |
| *B65G 7/00* | (2006.01) |
| *B65G 3/04* | (2006.01) |
| *G01F 22/00* | (2006.01) |
| *F24B 1/199* | (2006.01) |

(52) U.S. Cl.
CPC ............. *G01F 19/00* (2013.01); *B65D 90/48* (2013.01); *B65G 3/04* (2013.01); *B65G 7/00* (2013.01); *G01F 22/00* (2013.01); *B65D 2203/00* (2013.01); *B65G 2203/0241* (2013.01); *F24B 1/199* (2013.01)

(58) Field of Classification Search
CPC ........ B65D 90/48; B65D 88/00; B65D 90/00; B65D 2203/00; B65G 3/04; B65G 7/00; B65G 2203/0241; F24B 1/195; F24B 1/1999

USPC ............... 414/722, 901, 675; 206/305, 459.5; 73/427
See application file for complete search history.

(56) References Cited

U.S. PATENT DOCUMENTS 4,405,278 A * 9/1983 Kvalheim ..................... 414/608
(Continued)

OTHER PUBLICATIONS

How to Measure a Cord of Wood Article, Retrieved from http://firewoodresource.com/cord-of-wood/how-to-measure-a-cord-of-wood/, Feb. 26, 2014, 3 pages.
(Continued)

*Primary Examiner* — Gerald McClain
(74) *Attorney, Agent, or Firm* — Charney IP Law LLC

(57) ABSTRACT

An apparatus, system, and method for measuring, in accordance with a standard measure, any of a fractional part, whole and multiple of a quantity of chopped wood, such as firewood, for delivery to a customer are provided. The apparatus may be a bucket having one or more markers disposed thereon, using one or more measurement scales adapted to at least one of the bucket size, chopped wood size, and measurement system, where the markers indicate the quantity of chopped wood contained in the bucket. The apparatus may further comprise an attachment section to allow the apparatus to be attached to a vehicle to transport the apparatus. The method may include filling the apparatus to the markers with a plurality of pieces of chopped wood, delivering the chopped wood to a customer, and providing the customer with an assurance that the quantity of chopped wood is accurate.

19 Claims, 5 Drawing Sheets

(56) References Cited

U.S. PATENT DOCUMENTS

| | | | |
|---|---|---|---|
| 4,745,472 A * | 5/1988 | Hayes | 348/141 |
| 4,879,861 A | 11/1989 | McAdams | |
| 4,979,866 A * | 12/1990 | Croy | 414/525.6 |
| 5,141,109 A * | 8/1992 | Bergeron, Sr. | 206/599 |
| 5,524,950 A | 6/1996 | Erickson | |
| 5,755,816 A * | 5/1998 | Schirmer et al. | 414/782 |
| 5,941,234 A * | 8/1999 | Norburn et al. | 126/146 |
| 6,036,032 A * | 3/2000 | Moscatelli | 211/60.1 |
| 6,290,073 B1 | 9/2001 | Barnes, Sr. et al. | |
| 6,568,587 B1 * | 5/2003 | Yamada et al. | 116/227 |
| 6,669,402 B1 * | 12/2003 | Davis et al. | 404/6 |
| 6,997,667 B2 | 2/2006 | Hackett et al. | |
| 7,066,223 B2 | 6/2006 | Stone | |
| 7,712,233 B2 * | 5/2010 | Nesseth | 37/420 |
| 7,882,737 B2 * | 2/2011 | Coats et al. | 73/426 |
| 8,087,375 B2 * | 1/2012 | Silver | 73/290 R |
| 2007/0189642 A1* | 8/2007 | Materna | 383/100 |
| 2008/0271817 A1 | 11/2008 | Priebe | |

OTHER PUBLICATIONS

Firewood Rack Reviews, Retrieved from http://www.galttech.com/research/household-DIY-tools/firewood-storage-rack-reviews.php, Feb. 26, 2014, 2 pages.

Skid Steer Loader Attachments, Retrieved from http://au.alibaba.com/product/328731120-Skid-Steer-Loader-Attachments.html, Feb. 26, 2014, 2 pages.

Tractorbynet.com Forum, Firewood Racks, Retrieved from http://www.tractorbynet.com/forums/build-yourself/122078-firewood-racks.html#post1407250, Feb. 26, 2014, 4 pages.

Tractorbynet.com Forum, Firewood Racks, http://www.tractorbynet.com/forums/build-yourself/122078-firewood-racks.html#post1405392, Feb. 26, 2014, 4 pages.

Tractorbynet.com Forum, Firewood Racks, http://www.tractorbynet.com/forums/build-yourself/122078-firewood-racks-2.html#post1512238, Feb. 26, 2014, 3 pages.

* cited by examiner

APPARATUS AND METHOD FOR MEASURING CHOPPED WOOD WITH SERIES OF MEASUREMENT INDICATORS

CROSS-REFERENCE TO RELATED APPLICATIONS

This application claims the benefit of U.S. Provisional Application Ser. No. 61/498,532, filed Jun. 18, 2011, entitled "Method and Apparatus for Measuring Firewood," and U.S. Provisional Application Ser. No. 61/541,226, filed Sep. 30, 2011, entitled "Method and Apparatus for Measuring Firewood," which are incorporated herein by reference in its entirety.

BACKGROUND

1. Field of the Invention

The following generally relates to an apparatus, system, and method for more accurately measuring chopped wood, and for subsequently delivering such more accurately measured chopped wood to a customer. More specifically, the following relates to an apparatus, system, and method for measuring, and subsequently delivering, a fractional part, whole and/or multiples of a quantity (e.g., a cord) of chopped wood, such as firewood, in accordance with a standard measure.

2. Description of Related Art

Chopped wood, specifically firewood is usually measured, priced by and sold based on a given quantity. In many parts of the United States, the unit used for measuring a quantity of firewood is a cord (or full cord or firewood cord). The wood is typically cut into logs of sizes based on the firewood cord. One firewood cord is equivalent to a wood pile of 4 feet-long logs stacked 8 feet wide and 4 feet high (8'×4'×4') or 128 cubic feet. Similarly, a one-half firewood cord is equivalent to 64 cubic feet.

In some areas, a unit called a face cord may also be used rather than a firewood cord. However, the face cord is not a legally defined unit and may vary from one area to another. In Europe and Canada, firewood sales are based on a unit known as a stere. One stere is equivalent to one cubic meter, which is approximately 0.276 cords. In Australia, firewood is sold by the tonne. A tonne is a measurement of weight and not of volume, as with a stere or a firewood cord. The conversion from cord to tonne will depend on the density of the wood, as some woods are heavier than others per unit of volume.

Generally, chopped wood, specifically firewood, is used as a fuel and may be stored or transported in large quantities at cutting stations, warehouses, storage sites, customer's premises, and so forth. Typically, the firewood may be stored and/or loaded into a vehicle by using buckets. The buckets may be available in various shapes and sizes. Further, the firewood may be transported from one location to another for delivery. For example, the firewood may be loaded from a cutting station and delivered to the customer's premises.

The customer may require a measured quantity or amount of firewood. As per the regulations of weights-and-measures authorities of many countries or states, the seller of the firewood should give the customer some kind of assurance that the quantity delivered to the customer is substantially accurate (i.e. within tolerances sanctioned or approved by the weight-and-measures authority). Therefore, the firewood should be substantially accurately measured before delivering it to the customer. Measuring exact quantities of firewood (or wood) as per the weights-and-measures office of a jurisdiction can be a challenging task, as the measurement system followed for measuring the firewood may differ depending on the jurisdictions.

Firewood material vendors may be unaware of existing standards, and may knowingly or inadvertently short the customer a substantially accurate delivery, knowing that the consumer likely will accept the vendor's word for a substantially accurate delivery. Customers may have no way to verify the accuracy of the delivery quantity. Current apparatuses and methods for measuring quantities of firewood are not accurate.

The firewood may be stored in many ways, such as in stacks or piles of wood, or under the roof. In a stack, logs of firewood (or wood) are placed next to and on top of each other, forming a line the width of the logs. For delivery of the firewood at a customer's premises, loading and unloading of the firewood in a vehicle may be done manually by hand or by using some loading systems. However, existing loading systems may not be able to measure the quantity of the firewood or wood to be transported. In addition, manual loading and unloading of wood into a vehicle may be time consuming and may require a lot of effort. Furthermore, as explained above, the customer may not be sure that the amount of firewood delivered is measured accurately. The customer may require some kind of assurance regarding the accuracy of the quantity of firewood delivered.

The loading systems broadly include vehicles such as "compact track loaders" and "skid steer loaders". Compact track loaders are similar to skid steer loaders but generally refer to those vehicles having a dedicated track system for ground engagement. The different types of compact track loaders include multi-terrain loaders, all surface loaders, and all season vehicles. Exemplary compact track loaders are available from Takeuchi, Bobcat Company, and ASV Inc., an affiliate of Caterpillar.

Another type of compact loader commonly available is generally referred to as an all-wheel steer loader, and is available from Bobcat Company. Compact loaders are available from numerous companies including Bobcat Company, JCB, Case, New Holland, Gehl, Caterpillar, John Deere, Takeuchi, ASV, and Daewoo.

Skid steer loaders generally refer to those vehicles having wheels and tires, or having wheels and tires with tracks installed around the wheels and tires that steer as a result of the tires or tracks skidding. A skid-steer-compatible vehicle (e.g., a wheel loader, tractors, tele-handlers, and the like) may be compatible with a skid steer loader at least by reason of having a compatible quick connect system.

U.S. Pat. No. 6,997,667 assigned on its face to Skid Mor Development LLC, discloses an apparatus for material handling and a method for operating the same. The method includes loading material into a bucket attached to a loader assembly provided on the material handling apparatus, moving the bucket to a position over the dump box, and opening the bucket to cause material to drop from the bucket into the dump box. However, the functionality of the material handling apparatus is limited to loading and unloading of the material and cannot be used to measure the amount of material such as firewood.

Thus, there exists a need for an apparatus and method for more accurately measuring firewood and/or subsequent delivery of the more accurately measured quantity of firewood.

SUMMARY

Embodiments of the present invention generally relate to an apparatus, system, and method for accurately measuring chopped wood, such as firewood, for delivery to customers. In one embodiment of the present invention, there is provided an apparatus comprising: at least a bottom surface, a back surface, and a plurality of side surfaces, wherein each surface is made of a material capable of supporting a quantity of chopped wood. The apparatus further comprises a measurement indicator located on at least one of the surfaces of the apparatus for indicating the quantity of chopped wood contained within the apparatus.

In another embodiment of the present invention, there is provided a system comprising the apparatus according to the embodiment above, wherein the apparatus further comprises at least one attachment section. The system further comprises a first vehicle configured at least to attach to the apparatus by the at least one attachment section, and to move the apparatus to a new location.

In another embodiment of the present invention, there is provided a system comprising: providing an apparatus according to any one of the embodiments above; and loading the chopped wood into the apparatus until the chopped wood reaches a level that corresponds to a specific quantity as indicated by the measurement indicator.

BRIEF DESCRIPTION OF THE DRAWINGS

So the manner in which the above recited features of the present invention may be understood in more detail, a more particular description of embodiments of the present invention, briefly summarized above, may be had by reference to embodiments, several of which are illustrated in the appended drawings.

Figures in the appended drawings, like the detailed description, are examples. As such, the Figures and the detailed description are not to be considered limiting, and other equally effective examples are possible and likely. Furthermore, like reference numerals in the Figures indicate like elements, and wherein.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "comprise", "comprising", "comprises", "include", "including", and "includes" mean including but not limited to.

DETAILED DESCRIPTION

Embodiments of the present invention generally relate to an apparatus, system, and method for accurately measuring chopped wood, such as firewood, for delivery to customers. More specifically, embodiments of the present invention include an apparatus, such as a bucket, in which chopped wood, such as firewood, is placed and measured, and which is used to transfer the chopped wood to vehicles for delivery to the customers.

As used herein, the term "bucket" includes, without limitation, all objects that can store and/or carry or transport objects. Alternative devices, having similar properties, are also contemplated by embodiments of the present invention. Such exemplary devices may include, but are not limited to: hydraulic breaker, pallet forks, angle broom, auger, mower, sweeper, snow blower, tree spade, trencher, dumping hopper, ripper, tilt roller, snow blade, wheel saw, cement mixer, wood chipper machine, and so forth.

Figure 1A:
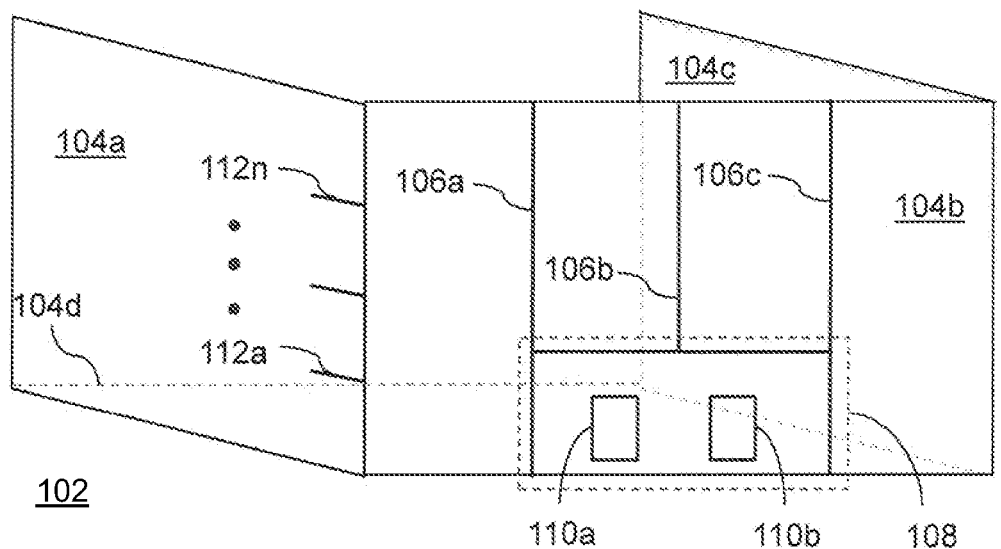
FIG. 1A is a perspective outside view drawing of an apparatus adapted for containing and measuring a quantity of chopped wood in accordance with an embodiment of the present invention.
Figure 1B:
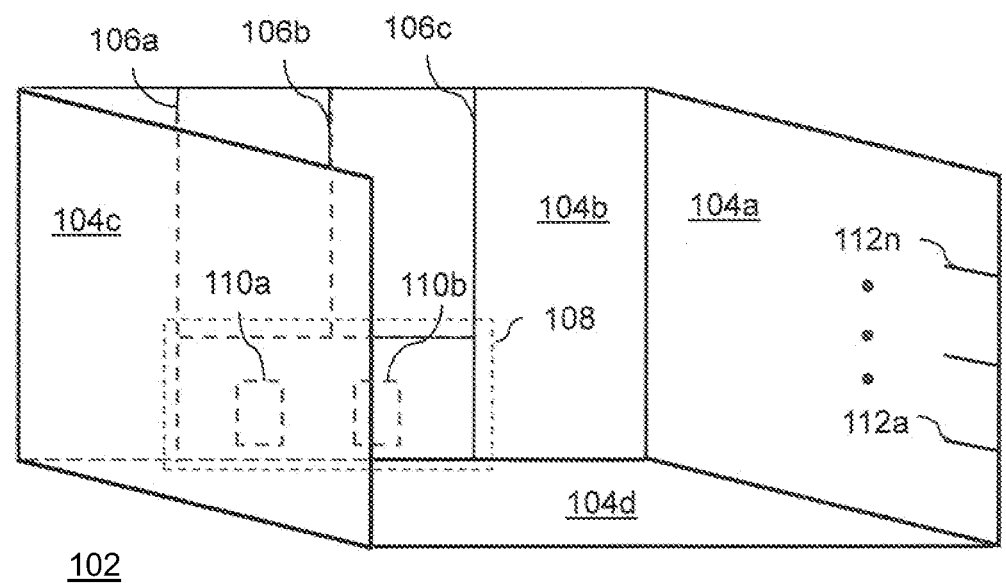
FIG. 1B is a perspective inside view drawing of the apparatus of FIG. 1A in accordance with an embodiment of the present invention.

FIGS. 1A and 1B are perspective view drawings of the exterior and the interior, respectively, of an exemplary apparatus or bucket 102 in accordance with an embodiment of the present invention. Bucket 102 is adapted for measuring any of a fractional part, whole and/or multiples of a quantity of chopped wood, such as firewood, in accordance with a standard measure that may be approved by the weights-and-measures authority, for delivery to a customer. For example, bucket 102 may be used for measuring the quantity of chopped wood, and for transferring the measured quantity of chopped wood into a transport vehicle (not shown), e.g., into a bed or box of any of a dump-body truck, utility truck, construction truck, flatbed truck, chassis truck and the like, for delivery to the customer or customer's premises. Bucket 102 may also be used for storing a measured quantity of other objects, including, but not limited to, boxes, rocks, sand, cement sacks, snow, stones, sacks of goods, cartons, crates, and the like, or any combination thereof.

The bucket 102 may include a first side 104a, a back side 104b, a second side 104c and a bottom 104d, which together form at least a portion of a receptacle within which pieces of chopped wood may be loaded. The side opposite of back side 104b may be an open side through which the chopped wood or other materials may be loaded into bucket 102. Alternatively, the side opposite of back side 104b may be a door, a gate, and the like that is openable, and may include a mechanism to secure closure, such as a latch. In at least one embodiment, bucket 102 may include more than four side faces. Bucket 102 may be formed in a given geometric shape, such as, for example, any of a cuboid, a rectangular cuboid and the like. The shape of bucket 102 depends on respective shapes and interconnections among the first side 104a, back side 104b, second side 104c and bottom 104d.

Each of the first side 104a, back side 104b, second side 104c and bottom 104d may be formed from any strong and durable material such that when fabricated or otherwise constructed, bucket 102 is capable of supporting a quantity of chopped wood disposed in a static position (e.g., when sitting on the ground) and during movement from the static position to a position that is coupled to a transport vehicle.

First side 104a, back side 104b, second side 104c and bottom 104d may be substantially closed to prevent unwanted release of chopped wood or other materials enclosed by bucket 102. As an example, one or more of the first side 104a, back side 104b, second side 104c and bottom 104d may comprise structural plates or substrates (hereinafter "structural plates") formed from a material, including any of steel, stainless steel, cast iron, tool steel, wrought iron, metal alloys, plastic, aluminum and the like, or any combination thereof. These structural plates may undergo any fabrication process (e.g., welded, conjoined, etc.) known to a person of ordinary skill in the art.

Figure 3:
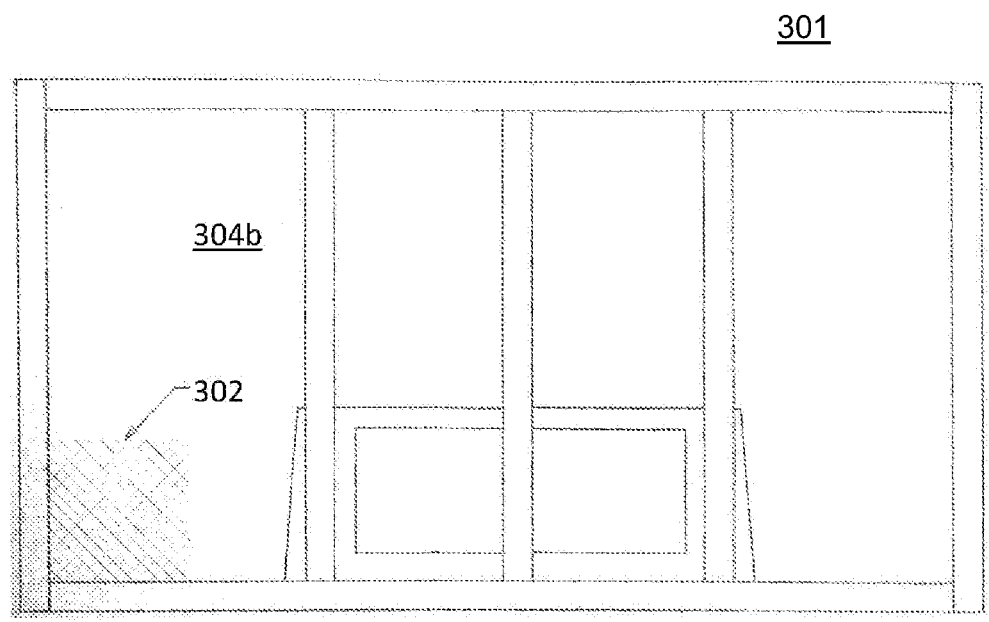
FIG. 3 is a front view drawing of an apparatus adapted for containing and measuring a quantity of chopped wood in accordance with an embodiment of the present invention.

First side 104a, back side 104b, second side 104c and bottom 104d may be substantially continuous. Alternatively, sides 104a-c may be fabricated or otherwise formed from a mesh-like material such as, but not limited to, chain link fencing, as depicted in FIG. 3, described hereinafter. The openings in the chain link should be small enough to substantially prevent the chopped wood or other material to be contained in bucket 102 from slipping through the mesh-like material.

First side 104a, back side 104b, second side 104c and bottom 104d may also be fabricated or otherwise formed from, for example, structural tubing. The structural tubing may be any of square structural tubing, rectangular structural tubing, circular structural tubing and like-shaped structural tubing; and may be formed from materials, such as steel, stainless steel, cast iron, tool steel, wrought iron, metal alloys, plastic, aluminum and the like. In general, the structural tubing, and in turn frames made from the tubing, may be formed from any strong and durable material capable of supporting a quantity of chopped wood.

The first side 104a may be formed as a first frame ("first-side frame"). The first-side frame may be fabricated or otherwise formed from, for example, structural tubing. The structural tubing may be any of square structural tubing, rectangular structural tubing, circular structural tubing and like-shaped structural tubing; and may be formed from materials, such as steel, stainless steel, cast iron, tool steel, wrought iron, metal alloys, plastic, aluminum and the like. In general, the structural tubing, and in turn the frames may be formed from any strong and durable material capable of supporting a quantity of chopped wood. Similarly, back side 104b, second side 104c and bottom 104d, may be formed as back frame, second frame and bottom frame, respectively, like that of first side 104a.

Furthermore, the frames may be supported by frame elements. For instance, FIG. 1A illustrates frame elements 106a-c used to provide support for a back-side frame 104b. While three frame elements 106a-c are depicted in FIG. 1A, it should be appreciated that any number of frame elements are contemplated, and may be incorporated into any of the frames.

Bucket 102 may be used for measuring a fractional part of a cord of chopped wood for delivery to a customer. For example, bucket 102 may be used for measuring, and loading the measured quantity of chopped wood into a vehicle at a cutting station. Furthermore, bucket 102 can measure a fractional part of a cord of chopped wood according to a standard measure. As explained above, the standard measure may be approved by a weights-and-measures office of a jurisdiction.

Further, bucket 102 may include one or more markings 112a-n disposed on one or more of the side faces 104a-c of the bucket 102. The one or more markings 112a-n may be indicative of a threshold for satisfying a standard measure. In at least one embodiment, bucket 102 may be filled until a marking of the one or more of markings 112a-n with a plurality of pieces of chopped wood so as to satisfy the threshold. The measurement system to be used for measuring the chopped wood may differ depending on the weights-and-measures office of different jurisdictions. Therefore, the one or more markings 112a-n may indicate different levels within a single measurement system, such as one-quarter chopped wood cord, one-half chopped wood cord, and so forth; or the one or more markings 112a-n may indicate different levels within multiple marking systems, such as one-half cord, one-half stere, and so forth.

The one or more markings 112a-n indicates a threshold for satisfying the approved standard measure. Bucket 102 can be filled, substantially levelly, until at least one marking of the one or more markings 112a-n in order to satisfy the threshold. Markings 112a-n may be placed on at least another side of sides 104a-c in order to more easily indicate to an operator filling bucket 102 that bucket 102 has been substantially levelly filled to a desired marking.

Furthermore, the markings 112a-n may have a safety factor built in to account for inconsistencies in each individual piece of chopped wood, such as knots, bent pieces, or any other factor preventing the wood from stacking uniformly.

In one embodiment, the inside volume of bucket 102 is equal to one-half of a cord of chopped wood, which is an amount of chopped wood that would fill a volume of 64 cubic feet. In this embodiment, the dimensions of the bucket 102 are based on the length of pieces of chopped wood (each of which should be approximately the same), and the ability to unload bucket 102 over a transport truck. For instance, the inside depth (i.e., from front to back of the bucket as attached to the loader) may be 2 feet to match a common size of chopped wood that fits in most fireplaces.

In at least one embodiment, the width of bucket 102 (left to right as attached to the loader) may be 8 feet to match the width of the bed of a transport truck. This leaves the height at 4 feet, which allows the loader to unload the chopped wood over the bed of the transport truck without tipping (or other adverse/hazardous conditions). A person skilled in art will appreciate that bucket 102 may have different dimensions for height, width and/or length than those dimensions described above.

Figure 2:
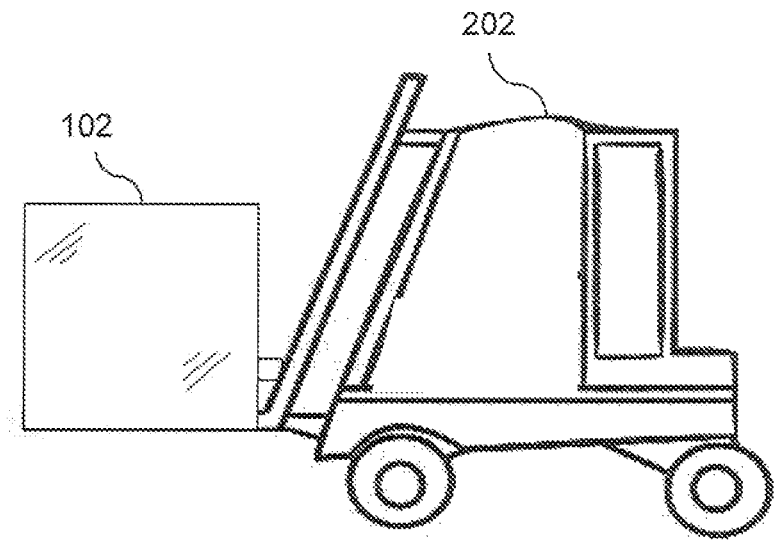
FIG. 2 is a side view drawing of the apparatus of FIG. 1A attached to a vehicle in accordance with an embodiment of the present invention.

Bucket 102 may further comprise an attachment section 108 for attaching bucket 102 to a first vehicle 202, as depicted in FIG. 2 and discussed hereinafter, such as a loader, a skid steer, and the like. In at least one embodiment, the attachment section 108 may comprise a coupler 110a and a coupler 110b. Examples of the couplers 110a-b include, but are not limited to, quick couplers, pin couplers, buffer and chain couplers, two cars couplers, and the like. Bucket 102, with the attachment section 108, may provide a convenient way of loading and unloading the chopped wood for transportation by reducing the time and manual effort required for loading and unloading the chopped wood, for example, into a second vehicle.

Chopped wood or other materials can be conveniently loaded or filled into bucket 102 through the open space opposite from back side 104b. In an embodiment, the chopped wood may be filled in the bucket in the bucket manually. In another embodiment, the chopped wood may be filled by pushing and tilting the bucket towards the piles or heaps of chopped wood with the help of a vehicle or loading system or loader.

The loose pieces of the chopped wood are stacked in within bucket 102 in a compact manner. In an exemplary scenario, the pieces of chopped wood are stacked in such a manner that two or more pieces of chopped wood touch each other. Further, the two or more pieces of chopped wood are aligned in parallel to each other (i.e., in accordance with customary allowances for geometric differences between the individual pieces of chopped wood).

FIG. 2 is a side view drawing of bucket 102 coupled to a first vehicle 202 that is usable for delivering firewood to a customer, in accordance with an embodiment of the present invention. Bucket 102 can be removably attached or coupled to first vehicle 202 by using the attachment section 108 and the couplers 110a-b. The first vehicle 202 is adapted for handling material, such as firewood, coal, and the like. The first vehicle 202 can be a skid steer loader or a compact track loader.

As explained hereinabove, the skid steer loader is a vehicle having wheels and tires, or having wheels and tires with tracks installed around the wheels and tires that steer as a result of the tires or tracks skidding. Compact track loader is similar to skid steer loader but generally refer to those vehicle having a dedicated tracks system for ground engagement. Types of compact track loaders include multi-terrain loaders, all surface loaders, and all season vehicles. Another type of compact loader is commonly available and is generally referred to as an all-wheel steer loader. This type of vehicle is available from Bobcat Company. Compact loaders are available from numerous companies including Bobcat Company, JCB, Case, New Holland, Gehl, Caterpillar, John Deere, Takeuchi, ASV, and Daewoo.

Further, the first vehicle 202 may include a front end and a rear end depending on the direction of the movement of the first vehicle 202. Bucket 102 may be removably attached to any of the front end or rear end of the first vehicle 202. In one embodiment, the first vehicle 202 may include an attaching tool for attaching to the bucket 102. In another embodiment, bucket 102 may be permanently attached to the first vehicle 202 as a part of the first vehicle 202.

The first vehicle 202 may be used to unload the attached bucket 102 into a second vehicle. The second vehicle may be adapted to transport the pieces of chopped wood from one place to another, such as to the customer's premises, and to dump or unload the chopped wood. For example, a loader can attach to bucket 102 filled with chopped wood up to a marking 112n, and thereafter, unload the chopped wood from bucket 102 into a box or bed of a utility truck. Examples of the second vehicle include, but are not limited to, a truck, a flat bed truck, chassis truck, construction truck, utility truck, a tractor, and the like.

FIG. 3 is a front view drawing of a bucket 301, in accordance with another embodiment of the present invention, with the interior of bucket 301 being visible. Bucket 301 may generally have the same structure and components as bucket 102 depicted in FIGS. 1A and 1B. As explained hereinabove, the back side 304b of bucket 301 may be formed from a mesh-like material 302. For sake of clarity, only a portion of mesh-like material 302 is shown forming at least a portion of back side 304b. Embodiments in accordance with the present invention may use the mesh-like material 302 to form a major surface on all sides of bucket 301 except for an open front, an open top, and a load-bearing bottom.

Figure 4:
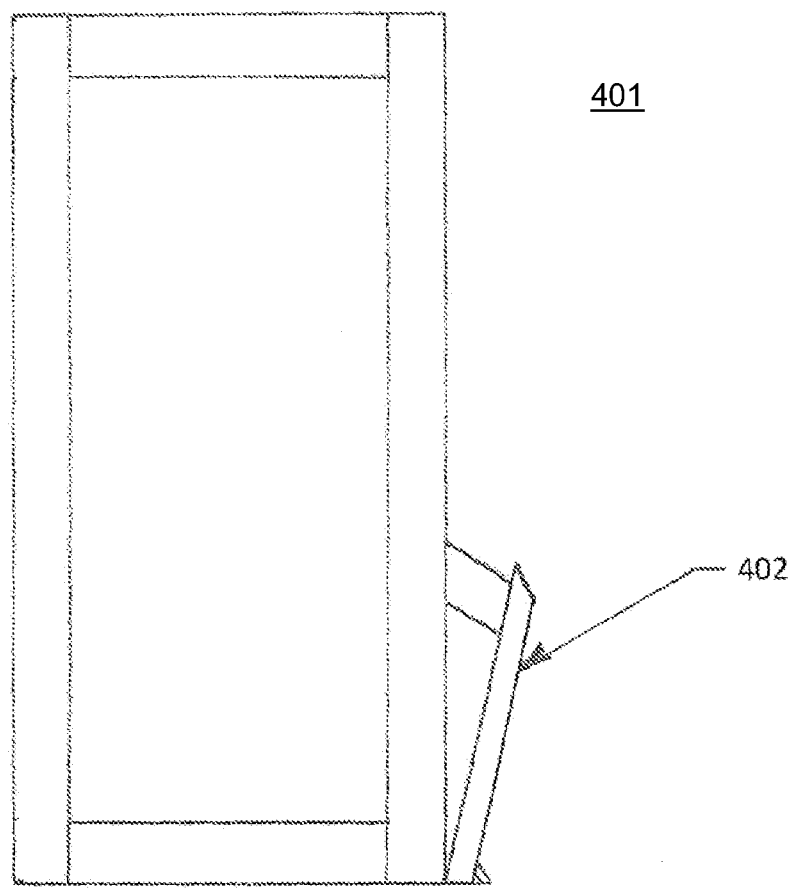
FIG. 4 is a side view drawing of an apparatus adapted for containing and measuring a quantity of chopped wood in accordance with an embodiment of the present invention.

FIG. 4 is a side view of a bucket 401 in accordance with another embodiment of the present invention. Bucket 401 may generally have the same structure and components as bucket 102 depicted in FIGS. 1A and 1B. Bucket 501 may further include a female quick connect 402 used to couple bucket 401 in a substantially rigid manner to a first vehicle such as a wheel loader (e.g., Caterpillar 904-B) and/or a skid steer loader (not shown), collectively "loader." One or more arms 403 are used to provide an offset of the female quick connect 402 from the body of bucket 401, by positioning female quick connect 402 at a desired angle from an adjacent vertical surface of bucket 401. The angle from the vertical of the female quick connect 402 may be designed to allow clearance for a Z bar mechanical interface from the loader to the bucket 401.

The Z bar mechanical interface may be a piston assembly on the loader that is used to dump or tilt an attachment (e.g., bucket 401). When the Z bar is in the full back, curl, or retract position, the piston assembly may extend and make contact with bucket 401. The angle of the female quick connect 402 is set to prevent contact with bucket 401. The angle may be set during manufacture of bucket 401, based upon the vehicle for which bucket 401 is designed, such as for a skid steer, wheel loader, loader backhoe, tractor, etc. Alternatively, the angle of female quick connect 402 may be set or reset by an adjustable mechanism such as a pin system. The angle is useful for wheel loaders that have a Z bar dump assembly. For a skid steer loader, the bucket will lean forward when the bucket is in the full back, curl, or retract position. The angle of the female quick connect 402 can be reduced and/or the quick connect 402 can be mounted higher from the bottom if desired.

Figure 5:
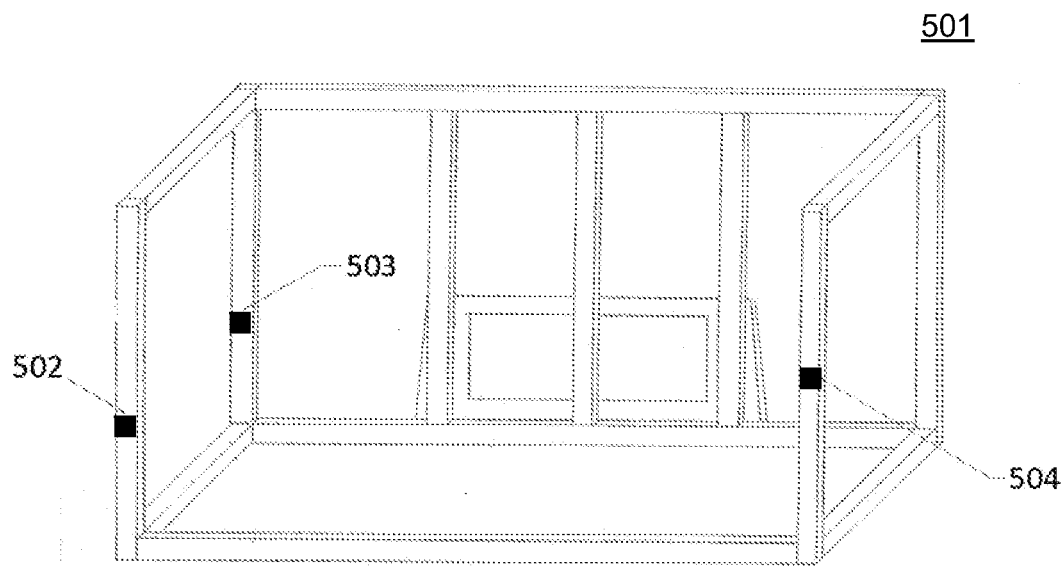
FIG. 5 is a perspective view drawing of an apparatus adapted for containing and measuring a quantity of chopped wood in accordance with an embodiment of the present invention.

FIG. 5 is a perspective view drawing of a bucket 501 in accordance with another embodiment of the the present invention. Bucket 501 may generally have the same structure and components as bucket 102 depicted in FIGS. 1A and 1B. However, bucket 501 comprises a plurality of scale markers 502, 503 and 504. Scale markers 502, 503 and 504 may be oriented vertically and may be used to measure a volume or quantity of chopped wood or other material loaded into bucket 501. Scale markers 502, 503 and 504 may be marked with any measurement scale that is appropriate for firewood, e.g., cord, stere, etc., including fractions and multiples thereof. At least one of scale markers 502, 503 and 504 may be marked with a measurement scale that is different than the measurement scale of the other markers. Furthermore, at least one of scale markers 502, 503 and 504 may be marked with more than one measurement scale. This may be useful for measuring volumes or quantities of different sizes of chopped wood. For example, scale marker 502 may be marked or calibrated to provide a desired volume or quantity of chopped wood when the chopped wood is cut into 24" lengths; scale marker 503 may be marked or calibrated to provide a desired volume or quantity of chopped wood when the chopped wood is cut into 16" lengths; and scale marker 504 may be marked or calibrated to provide a desired volume or quantity of chopped wood when the chopped wood is cut into 12" lengths. The measurement scales may be marked to indicate a fill level in order to provide full or fractional levels such as a full cord, a half cord, and so forth, for a particular size of chopped wood.

The scale markers 502, 503 and 504 may be replaceable and/or adjustable in order to accommodate more than one size of bucket 501. This reduces the importance of knowing precise dimensions of bucket 501 when attempting to provide a desired quantity of chopped wood. In such an embodiment, one or more of scale markers 502, 503 and 504 may be fitted, adjusted to, or marked in accordance with the size of bucket 501. An operator would provide a known quantity of chopped wood by filling bucket 501 to a scale marking on one or more of scale markers 502, 503 and 504. There may be provided pairs of one or more of scale markers 502, 503 and 504 on different sides of bucket 501 in order to provide the operator an indication of a level load of chopped wood.

Similar to bucket 102, bucket 501 may have an open fourth side in order to facilitate loading of bucket 501. In this way, loading may be accomplished by shoving bucket 501 into a stacked pile of chopped wood of a known size by use of a skid steer loader or similar vehicle or device. After bucket 501 is loaded this way, bucket 501 maybe tilted backwards to help keep chopped wood from falling out of bucket 501, and then bucket 501 is withdrawn from the stacked pile of chopped wood by the skid steer loader.

Figure 6:
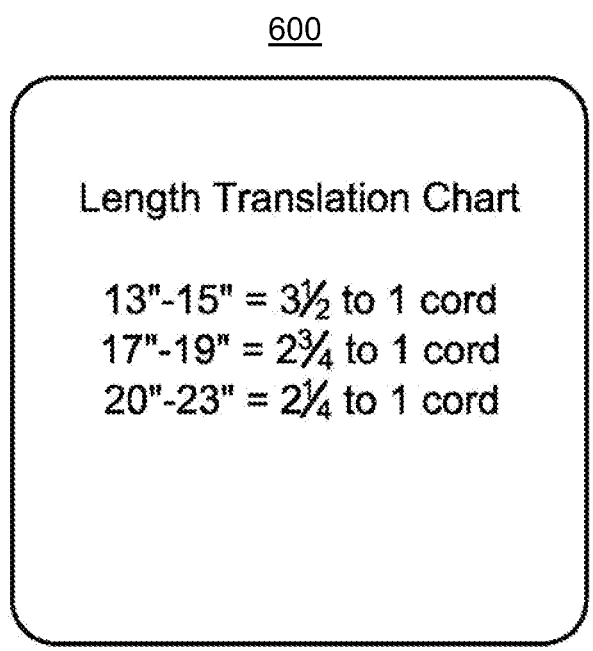
FIG. 6 is a front view drawing of a translation chart in accordance with an embodiment of the present invention.

FIG. 6 is a front view drawing of an exemplary length translation chart 600. The chart 600 determines the maximum quantity of the chopped wood that may be contained by any one of the buckets described above, given a length of each piece of the chopped wood, where the quantity corresponds to a measurement unit. The measurement unit may be a cord, a stere, a tonne, a cubic foot, a cubic meter, or any other measurement unit known to a person of ordinary skill in the art.

Figure 7:
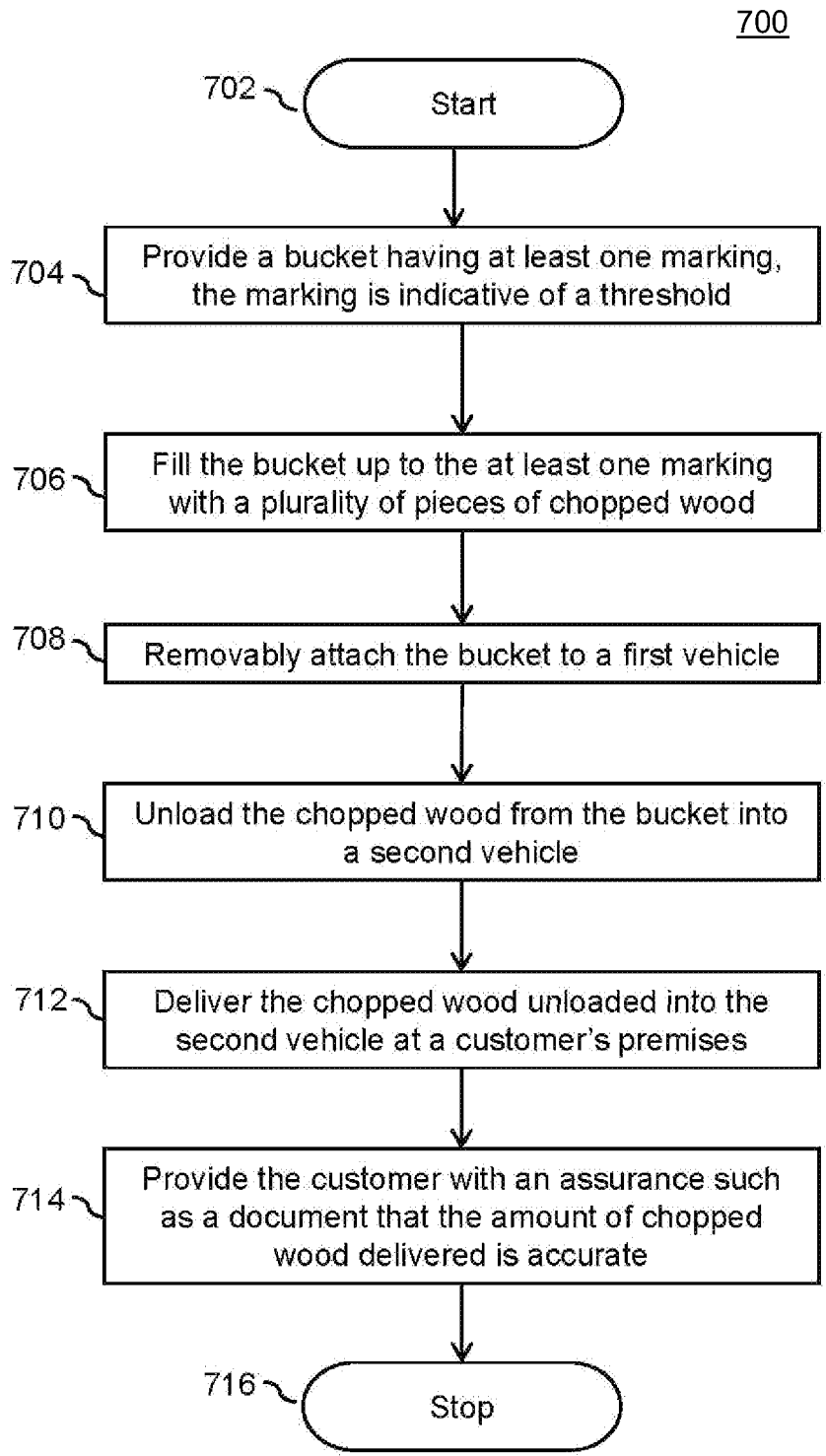
FIG. 7 is a flow diagram illustrating an exemplary method for measuring and delivering a quantity of chopped wood in accordance with an embodiment of the present invention.

FIG. 7 is a flow diagram illustrating an exemplary method 700 for measuring and delivering a fractional part of a cord of chopped wood, in accordance with embodiments of the present disclosure. While bucket 102 is used as an exemplary bucket for method 300, it should be appreciated that any bucket in accordance with embodiments of the present invention may be used. Method 700 starts at process block 702.

At process block 704, a bucket 102 for measuring and/or transporting chopped wood is provided. As discussed above with respect to FIGS. 1A and 1B, bucket 102 may comprise at least one marking 112, which is indicative of a threshold that satisfies s standard measure. The measure may be approved by the weights-and-measures authority such as New Jersey weights-and-measures authority for the New Jersey region.

At process block 706, bucket 102 may be filled with a plurality of pieces of chopped wood up to the at least one marking 112. The chopped wood may be filled or stacked in bucket 102 manually. Alternatively, the chopped wood may be filled by pushing and tilting bucket 102 towards the piles or heaps of chopped wood with the help of a first vehicle.

The plurality of pieces of chopped wood should generally be cut to the same lengths in order to provide an accurate measurement and thereby satisfy the customer's order. In addition, the plurality of pieces of chopped wood should generally be filled in a compact manner in bucket 102 so as to minimize measurements of volume not associated with the chopped wood, i.e., gaps of air. As explained above, the markings 112n may have a safety factor built in to account for inconsistencies in each individual piece of chopped wood, such as knots, bent pieces, or any other factor preventing the wood from stacking uniformly. For example, the plurality of pieces of chopped wood may be stacked within bucket 102 in such a manner that they touch each other and are also aligned parallel to each other.

At process block 708, bucket 102, filled with the plurality of pieces of chopped wood, is attached to a first vehicle, such as a loader, by using the attachment section 108. As explained above, the first vehicle is generally adapted for material handling, and may be a skid steer, a bobcat loader, a backhoe loader, a grader, a tractor, an excavator, a crane, and the like.

At process block 710, the first vehicle unloads the chopped wood from the bucket into a second vehicle. As explained above, the second vehicle may be any vehicle with a bed or box such as a dump-body truck, a utility truck, a construction truck, a flatbed truck, a chassis truck, and the like, capable of transporting the chopped wood to a location, such as the customer's premises. The second vehicle may also be adapted to dump or unload the chopped wood at the final location. Process blocks 706 through 710 may be repeated as many times as desired or as necessary, for example, to fulfill a customer's order.

At process block 712, the second vehicle transports the chopped wood to the customer's premises. At process block 714, the customer may be provided with an assurance that the amount of chopped wood delivered is substantially accurate (i.e., within tolerances sanctioned or approved by the weights-and-measures office of a given jurisdiction). The assurance may include a document indicating the amount of firewood delivered is substantially accurate. In an exemplary scenario, the document may be a serialized delivery ticket or a sales invoice containing one or more information. Examples of the one or more information include, but are not limited to, legal name and address of a seller of the chopped wood, a name and address of a buyer of the chopped wood, delivery date, quantity or amount of chopped wood delivered, quantity upon which the price is based, if this differs from the delivery quantity, the price of the amount of chopped wood delivered, an identity of the most descriptive terms commercially practicable, including any quality representation made in connection with the sale (for example, seasoned mixed hardwoods), the serial number of the delivery ticket or invoice, and so forth.

Further, the document may include an official endorsement from the weights-and-measures office of a given jurisdiction indicating that the amount of chopped wood delivered is substantially accurate. The official endorsement may be any of an official seal, official stamp, an official device, a signature of an authorized officer of the weights-and-measures authority, and so forth.

Method 700 ends at process block 716.

While the foregoing is directed to embodiments of the present disclosure, other and further embodiments of the invention may be devised without departing from the basic scope thereof. It is understood that various embodiments described herein may be utilized in combination with any other embodiment described, without departing from the scope contained herein. Further, the foregoing description is not intended to be exhaustive or to limit the invention to the precise form disclosed. Modifications and variations are possible in light of the above teachings or may be acquired from practice of the invention.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Further, as used herein, the term "set" is intended to include any number of items, including zero. Further, as used herein, the term "number" is intended to include any number, including zero.

Moreover, the claims should not be read as limited to the described order or elements unless stated to that effect. In addition, use of the term "means" in any claim is intended to invoke 35 U.S.C. §112, ¶6, and any claim without the word "means" is not so intended.

What is claimed is:

1. An apparatus comprising:
   at least a bottom surface, a back surface, and a plurality of side surfaces, wherein each surface is made of a material capable of supporting a stacked quantity of chopped wood;
   a series of measurement indicators located on at least one of the back surface and the plurality of side surfaces of the apparatus for indicating the quantity of chopped wood stacked within the apparatus, the series of measurement indicators being associated with a nominal length of chopped wood; and a second series of measurement indicators located on at least one of the back surface and the plurality of side surfaces of the apparatus for indicating the quantity of chopped wood stacked within the apparatus, the second series of measurement indicators being associated with a second nominal length of chopped wood;

wherein the nominal length of chopped wood and the second nominal length of chopped wood are substantially different nominal lengths;

wherein the measurement indicators correspond to discrete fractional intervals of at least ⅛ of a chopped wood cord.

2. The apparatus of claim 1, wherein said bottom surface is sized to accommodate chopped wood of between 12 inches and 24 inches in length.

3. The apparatus of claim 1, wherein said series of measurement indicators correspond to a known measurement governed by a weights-and-means authority.

4. The apparatus of claim 1, where said series of measurement indicators are equally spaced.

5. The apparatus of claim 1, further comprising a device to determine the maximum quantity of the chopped wood that may be stacked within the apparatus, given a length of each piece of the chopped wood, where the quantity corresponds to fractions of a cord of chopped wood.

6. The apparatus of claim 1, wherein at least a portion of at least one of the bottom surface, the back surface, and the plurality of side surfaces comprises a mesh pattern.

7. The apparatus of claim 1, further comprising a female quick connect enabling connection of said apparatus in a substantially rigid manner to a first vehicle, said female quick connect including one or more arms to provide an angled offset of the female quick connect from said back surface of said apparatus.

8. The apparatus of claim 1, wherein said discrete fractional intervals are intervals of ¼ of a chopped wood cord.

9. The apparatus of claim 1, wherein said discrete fractional intervals are ⅓ of a chopped wood cord.

10. The apparatus of claim 1, wherein said discrete fractional internals are based on measurements of chopped wood with lengths ranging between 12 inches and 24 inches, including at least one series of discrete fractional intervals of ⅛, ⅙, ¼, or ⅓, to provide a substantially accurate measured amount of chopped wood.

11. The apparatus of claim 1, wherein said measurement indicators are associated with chopped wood of any one nominal length of 12 inches, 16 inches, and 24 inches.

12. The apparatus of claim 1, wherein said nominal length is 12 inches and said second nominal length is 16 inches.

13. A method comprising:
providing an apparatus comprising:
at least a bottom surface, a back surface, and a plurality of side surfaces, wherein each surface is made of a material capable of supporting a stacked quantity of chopped wood; and
a series of measurement indicators located on at least one of the surfaces of the apparatus for indicating the quantity of chopped wood stacked within the apparatus, given a length of each piece of the chopped wood, said quantity being measured as fractions of a cord of chopped wood; and stacking the chopped wood in the apparatus until the chopped wood reaches a level that corresponds to a specific quantity as indicated by one of the measurement indicators;
wherein the measurement indicators correspond to discrete fractional intervals of at least ⅛ of a chopped wood cord.

14. The method of claim 13, further comprising the step of providing documentation to the customer indicating that the quantity of chopped wood, measured in at least fractions of a cord, delivered to the customer is substantially accurate.

15. The method of claim 13, wherein the apparatus further comprises an attachment section by which the apparatus containing the quantity of chopped wood is attached to a first vehicle configured to transport the apparatus containing the quantity of chopped wood to a first new location, and to load and unload the quantity of chopped wood.

16. The method of claim 15, wherein the first new location is a second vehicle configured to transport the quantity of chopped wood to a second new location.

17. The method of claim 16, further comprising the step of unloading, by the first vehicle, the quantity of chopped wood from the apparatus onto the second vehicle.

18. The method of claim 17, further comprising the step of transporting, by the second vehicle, the quantity of chopped wood to the second new location.

19. The method of claim 18, wherein the second new location is a premises of a customer.

* * * * *